(12) United States Patent
Neves Creto

(10) Patent No.: US 11,443,053 B2
(45) Date of Patent: Sep. 13, 2022

(54) DISPLAYING SENSITIVE CONTENT BASED ON AUTHENTICATION USING AN UNDER-DISPLAY SENSOR

(71) Applicant: Motorola Mobility LLC, Chicago, IL (US)

(72) Inventor: Alexandre Neves Creto, São Paulo (BR)

(73) Assignee: Motorola Mobility LLC, Chicago, IL (US)

( * ) Notice: Subject to any disclaimer, the term of this patent is extended or adjusted under 35 U.S.C. 154(b) by 309 days.

(21) Appl. No.: 16/548,640

(22) Filed: Aug. 22, 2019

(65) Prior Publication Data

US 2021/0019437 A1 Jan. 21, 2021

Related U.S. Application Data

(63) Continuation-in-part of application No. 16/514,769, filed on Jul. 17, 2019.

(51) Int. Cl.
| | | |
|---|---|---|
| *G06F 21/62* | (2013.01) | |
| *G06F 21/36* | (2013.01) | |
| *G06F 3/0482* | (2013.01) | |
| *G06F 3/04817* | (2022.01) | |

(Continued)

(52) U.S. Cl.
CPC ........ *G06F 21/6218* (2013.01); *G06F 3/0482* (2013.01); *G06F 3/04817* (2013.01); *G06F 21/32* (2013.01); *G06F 21/36* (2013.01); *G06V 40/1365* (2022.01)

(58) Field of Classification Search
CPC .... G06F 1/1684; G06F 1/1686; G06F 1/1696; G06F 3/0481; G06F 3/04817; G06F 3/0482; G06F 21/31; G06F 21/316; G06F 21/32; G06F 21/36; G06F 21/62; G06F 21/6218–6281; G06K 9/00006–0012; G06K 9/00221–00315;

(Continued)

(56) References Cited

U.S. PATENT DOCUMENTS

| | | | |
|---|---|---|---|
| 2003/0135288 A1* | 7/2003 | Ranganathan | ........ G06F 1/3203 700/79 |
| 2015/0079943 A1* | 3/2015 | Williams | .............. H04W 12/08 455/411 |

(Continued)

OTHER PUBLICATIONS

"Restriction Requirement", U.S. Appl. No. 16/514,769, dated Apr. 27, 2022, 7 pages.

*Primary Examiner* — Kevin Bechtel
(74) *Attorney, Agent, or Firm* — FIG. 1 Patents

(57) ABSTRACT

A sensitive content display control system determines whether to display sensitive content on a computing device display, such as on a lock screen. The system attempts to authenticate a user of the computing device using an under-display sensor (e.g., a fingerprint sensor). One or more selectable items (e.g., icons or buttons) that correspond to sensitive content are displayed, and the under-display sensor is situated to sense authentication information of the user in response to user selection of one of the selectable items. If the user is not authenticated then the system does not display sensitive content corresponding to the one or more selectable items. If the user is authenticated, then the system displays the sensitive content corresponding to the selected item.

20 Claims, 11 Drawing Sheets

(51) Int. Cl.
 *G06F 21/32* (2013.01)
 *G06V 40/12* (2022.01)
(58) Field of Classification Search
 CPC .. G06K 9/00597–00617; H04L 9/3231; H04L 63/0861
 See application file for complete search history.

(56) References Cited

U.S. PATENT DOCUMENTS

2018/0101715 A1* 4/2018 Lee ................... G06K 9/00026
2021/0209206 A1* 7/2021 Li .................... H04M 1/72436

* cited by examiner

DISPLAYING SENSITIVE CONTENT BASED ON AUTHENTICATION USING AN UNDER-DISPLAY SENSOR

RELATED APPLICATIONS

This application is a continuation-in-part of U.S. patent application Ser. No. 16/514,769, filed Jul. 17, 2019, entitled "Displaying Sensitive Content Based On Whether Others Are Around User", the disclosure of which is hereby incorporated by reference herein in its entirety.

BACKGROUND

As technology has advanced, people have become increasingly reliant upon a variety of different computing devices, such as wireless devices (e.g., wireless phones or smartwatches). While these computing devices offer a variety of different benefits, they are not without their problems. One such problem is that computing devices oftentimes display content in response to various events, such as receipt of a text message from another user. Frequently, this content is displayed automatically by the computing device, resulting in the content being visible to other people near the computing device. Unfortunately, this can lead to sensitive content (e.g., messages the user of the computing device desires to keep private) being visible to various people other than the user of the computing device. This ability for other people to view sensitive content can lead to user dissatisfaction and frustration with their computing devices.

BRIEF DESCRIPTION OF THE DRAWINGS

Embodiments of displaying sensitive content based on authentication using an under-display sensor are described with reference to the following drawings. The same numbers are used throughout the drawings to reference like features and components.

DETAILED DESCRIPTION

Figure 1:
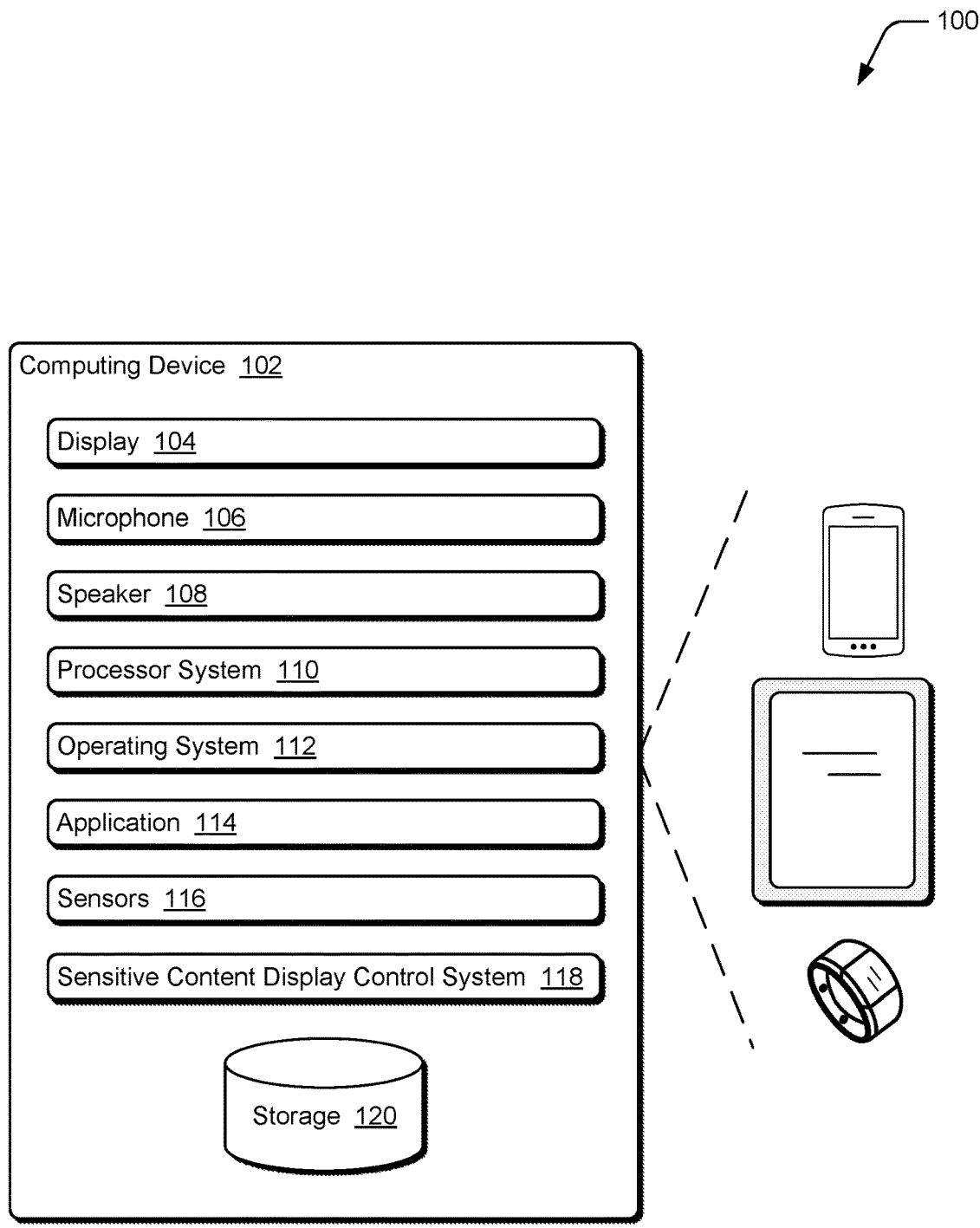
FIG. 1 illustrates an example computing device implementing the techniques discussed herein.

Displaying sensitive content based on authentication using an under-display sensor is discussed herein. Generally, the techniques discussed herein authenticate a user of a computing device, optionally determine whether anyone in addition to the user is looking at the computing device, and determine whether to display sensitive content based on that authentication and optionally the determination. The sensitive content is displayed, for example, on a lock screen of the computing device. The sensitive content can take various different forms, such as messages (e.g., text messages, pictures, emails, etc.) that are displayed to the user.

More specifically, a sensitive content display control system determines whether a user is present at the computing device display. If no one is present at the computing device display, then the sensitive content display control system does not display sensitive content at the computing device. However, if a user is present at the computing device display, then the sensitive content display control system determines whether the user is an authorized user of the computing device. The sensitive content display control system makes this determination by using at least one type of authentication mechanism, such as a biometric authentication mechanism (e.g., such as a face recognition mechanism, an iris recognition mechanism, a voice recognition mechanism, and so forth), a fingerprint authentication mechanism, and so forth.

If the user present at the computing device display is not an authorized user of the computing device, then the sensitive content display control system does not display sensitive content at the computing device. However, if the user present at the computing device display is an authorized user of the computing device, then in one or more embodiments the sensitive content display control system determines whether there are any people in addition to the user that are able to view the computing device display. The sensitive content display control system can determine whether there are any people in addition to the user that are able to view the computing device display in various different manners, such as based on image capture, audio capture, thermal sensors, proximity sensors, and so forth.

If there are no people in addition to the user that are able to view the computing device display, then the sensitive content display control system displays sensitive content at the computing device. However, if there are people in addition to the user that are able to view the computing device display, then the sensitive content display control system does not display sensitive content at the computing device.

Additionally or alternatively, whether the user present at the computing device display is an authorized user of the computing device is determined using an under-display sensor (e.g., a fingerprint sensor). One or more selectable items that correspond to sensitive content are displayed, and the under-display sensor is situated to sense authentication information of the user in response to user selection of one of the selectable items. A selectable item refers to a visual indication (e.g., an icon or a button) displayed on the computing device display. The sensitive content that corresponds to the selectable item refers to sensitive content that is accessed by user input selecting the selectable item (e.g., a notification that is displayed in response to user input selecting an icon on the computing device display). If the user present at the computing device display is not an authorized user of the computing device, then the sensitive content display control system does not display sensitive content at the computing device. However, if the user present at the computing device display is an authorized user of the computing device, then the sensitive content display control system displays sensitive content at the computing device.

The sensitive content display control system displays a lock screen on which the sensitive content can be displayed. In one or more embodiments, the computing device operates in a low power mode in which only a certain portion of the display is activated when displaying the lock screen. For example, pixels in only a portion of the display are activated so that the sensitive content (if displayed), a current time and date, and one or more user-selectable items are displayed. If the user chooses to unlock the computing device (e.g., via entry of a password), then the computing device transitions to a higher power mode in which all of the display is activated.

The techniques discussed herein improve security of sensitive content and provide a seamless user experience in viewing the sensitive content. This results in a system that provides privacy (e.g., works to keep sensitive content private), convenience (e.g., the user need simply touch the icon or other selectable item he or she would normally need to touch to access the sensitive content), and security (e.g., the user is authenticated). In one or more implementations, if sensitive content is to be displayed (e.g., a text message is received) and someone picks up the computing device (e.g., a smartphone), the sensitive content is displayed only if the person that picks up the computing device is an authorized user of the computing device and there are not any other people in addition to the user that are able to view the computing device display. Additionally or alternatively, if sensitive content is to be displayed (e.g., a text message is received) and someone picks up the computing device (e.g., a smartphone), the sensitive content is displayed only if the person selects a displayed selectable item indicating that the sensitive content is to be displayed and the person is an authorized user of the computing device as determined based on an under-display sensor. If the user desires to view the sensitive content despite others possibly being able to view the sensitive content or the person not being authorized based on the under-display sensor, the user can unlock the computing device and view the sensitive content.

FIG. 1 illustrates an example computing device 102 implementing the techniques discussed herein. The computing device 102 can be many different types of computing or electronic devices. For example, the computing device 102 can be a smartphone or other wireless phone, a notebook computer (e.g., netbook or ultrabook), a laptop computer, a wearable device (e.g., a smartwatch), a tablet or phablet computer, a personal media player, an Internet of Things (IoT) device, an automotive computer, and so forth.

The computing device 102 includes a display 104, a microphone 106, and a speaker 108. The display 104 can be configured as any suitable type of display, such as an organic light-emitting diode (OLED) display, active matrix OLED display, liquid crystal display (LCD), in-plane shifting LCD, projector, and so forth. The microphone 106 can be configured as any suitable type of microphone incorporating a transducer that converts sound into an electrical signal, such as a dynamic microphone, a condenser microphone, a piezoelectric microphone, and so forth. The speaker 108 can be configured as any suitable type of speaker incorporating a transducer that converts an electrical signal into sound, such as a dynamic loudspeaker using a diaphragm, a piezoelectric speaker, non-diaphragm based speakers, and so forth.

Although illustrated as part of the computing device 102, it should be noted that one or more of the display 104, the microphone 106, and the speaker 108 can be implemented separately from the computing device 102. In such situations, the computing device 102 can communicate with the display 104, the microphone 106, and/or the speaker 108 via any of a variety of wired (e.g., Universal Serial Bus (USB), IEEE 1394, High-Definition Multimedia Interface (HDMI)) or wireless (e.g., Wi-Fi, Bluetooth, infrared (IR)) connections. For example, the display 104 may be separate from the computing device 102 and the computing device 102 (e.g., a streaming media player) communicates with the display 104 via an HDMI cable. By way of another example, the microphone 106 may be separate from the computing device 102 (e.g., the computing device 102 may be a television and the microphone 106 may be implemented in a remote control device) and voice inputs received by the microphone 106 are communicated to the computing device 102 via an IR or radio frequency wireless connection.

The computing device 102 also includes a processor system 110 that includes one or more processors, each of which can include one or more cores. The processor system 110 is coupled with, and may implement functionalities of, any other components or modules of the computing device 102 that are described herein. In one or more embodiments, the processor system 110 includes a single processor having a single core. Alternatively, the processor system 110 includes a single processor having multiple cores or multiple processors (each having one or more cores).

The computing device 102 also includes an operating system 112. The operating system 112 manages hardware, software, and firmware resources in the computing device 102. The operating system 112 manages one or more applications 114 running on the computing device 102, and operates as an interface between applications 114 and hardware components of the computing device 102.

The computing device 102 also includes one or more sensors 116. A variety of different types of sensors 116 can be included in the computing device 102, such as a thermal sensor, a proximity sensor, an image capture device (e.g., a camera), an active IR sensor, a passive IR sensor, a fingerprint sensor, and so forth. In one or more embodiments, the sensors 116 include an under-display sensor that is situated behind or below the display 104. The top or front of the display 104 is the surface of the display 104 that the user of the computing device 102 views. The under-display sensor is situated on the opposite side of the display 104.

The computing device 102 also includes a sensitive content display control system 118. The sensitive content display control system 118 authenticates a user of the computing device 102 as well as determines whether anyone in addition to the user is able to view the display 104, and determines whether to display sensitive content based on this authentication and determination. The sensitive content can take various different forms, such as text, pictures, other images or video, and so forth.

The sensitive content can be identified in a variety of different manners. In one or more embodiments, the sensitive content is identified based on the source of the content (e.g., an application 114 or a program of the operating system 112). Some applications or programs provide sensitive content to the sensitive content display control system 118 to display, and others do not. For example, music playback applications, sports applications displaying scores and updates, weather applications, and so forth do not provide sensitive content to display, whereas messaging applications, email applications, and social media applications do provide sensitive content to display. Optionally, the application or program providing the content to the computing devices 118 for display indicate whether the content is sensitive content. A user input specifying which applications or programs provide (or do not provide) sensitive content can also be received by the sensitive content display control system 118.

Additionally or alternatively, whether content is sensitive content can be based on a sender of the content. The sender of the content refers to an originator of the content, such as a user sending an email or instant message, a user posting an update on a social media platform, and so forth. An application or program provides this content to the sensitive content display control system 118 for display. Some senders (as identified by a sender identifier, such as a name, email address, account identifier, etc.) do not provide sensitive content whereas other senders do provide sensitive content. For example, senders that are family members or business contacts provide sensitive content but senders that are news organizations or advertisers to not provide sensitive content. A user input specifying which senders provide (or do not provide) sensitive content can also be received by the sensitive content display control system 118.

Additionally or alternatively, whether content is sensitive content can be based on the content itself. Various rules or criteria can be used to indicate whether content is sensitive content, such as identification of particular keywords or phrases in the content that indicate that the content is sensitive content (or not sensitive content). A user input specifying these rules or criteria can also be received by the sensitive content display control system 118.

In one or more embodiments, the sensitive content refers to notifications (e.g., text or images) that are provided by various applications or programs. These notifications can include, for example, notifications of received emails messages (e.g., the notification is at least a portion of the email message), notifications of received instant messages (e.g., the notification is at least a portion of a short message service (SMS) message or multimedia messaging service (MMS) message), notifications of received social media updates (e.g., the notification is at least a portion of the social media update) and so forth. Whether the notifications are sensitive content can be determined in various manners as discussed above. For example, notifications from messaging applications, email applications, and social media applications are sensitive content, but notifications from music playback applications, sports applications, and weather applications, are not sensitive content.

The sensitive content display control system 118 optionally displays notifications on a lock screen of the computing device 102. The lock screen refers to a screen that the computing device 102 displays with a limited amount of information on it, and from which the user can provide authentication information (e.g., a personal identification number (PIN), a password, etc.) to unlock and gain full access to the computing device 102. The information displayed on the lock screen can include, for example, one or more of the current time, the current date, a battery charge level, and notifications provided by various applications or programs.

The computing device 102 can optionally operate in multiple different power modes, including at least a low power mode and a higher power mode. Various different power conserving techniques can be used in the low power mode, such as activating or powering only a portion of the display 104 to be able to display data (e.g., only the area on the display 104 where notifications or selectable items are displayed), deactivating or powering down certain processors or processor cores, deactivating or powering down certain sensors 116, and so forth. In the higher power mode, one or more of these power conserving techniques are reversed (e.g., the entire display 104 is activated or powered on, processors or processor cores are activated or powered on, certain sensors 116 are activated or powered on, and so forth).

The sensitive content display control system 118 can be implemented in a variety of different manners. For example, the sensitive content display control system 118 can be implemented as multiple instructions stored on computer-readable storage media and that can be executed by the processor system 110. Additionally or alternatively, the sensitive content display control system 118 can be implemented at least in part in hardware (e.g., as an application-specific integrated circuit (ASIC), a field-programmable gate array (FPGA), and so forth).

The computing device 102 also includes a storage device 120. The storage device 120 can be implemented using any of a variety of storage technologies, such as magnetic disk, optical disc, Flash or other solid state memory, and so forth. The storage device 120 can store various program instructions and data for the operating system 112, application 114, or sensitive content display control system 118.

Figure 2:
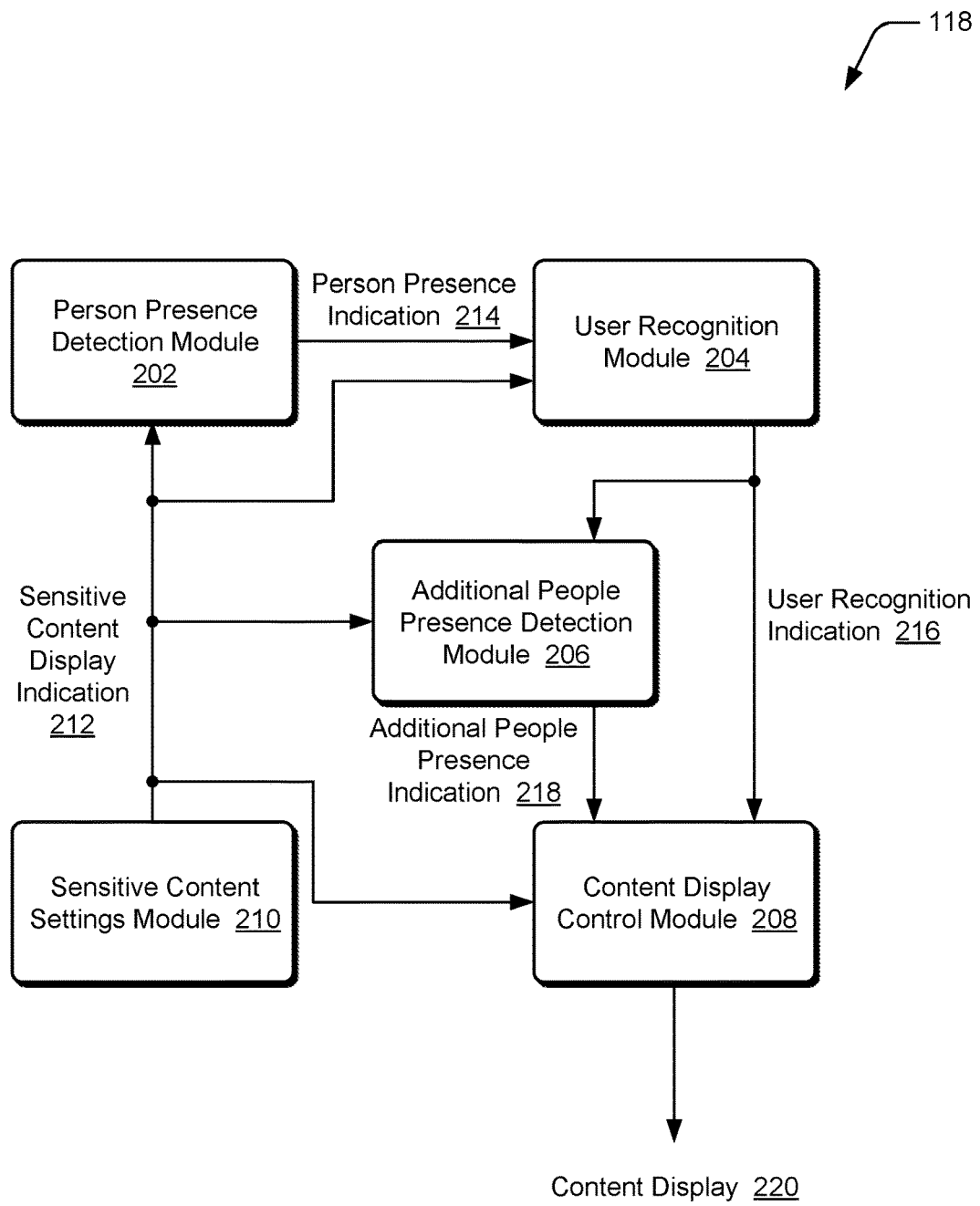
FIG. 2 illustrates an example sensitive content display control system in accordance with one or more embodiments.

FIG. 2 illustrates an example sensitive content display control system 118 in accordance with one or more embodiments. The sensitive content display control system 118 includes a person presence detection module 202, a user recognition module 204, an additional people presence detection module 206, a content display control module 208, and a sensitive content settings module 210

The sensitive content settings module 210 provides a sensitive content display indication 212 to one or more of the modules 202, 204, 206, and 208. The sensitive content settings module 210 receives a user input indicating whether sensitive content is to be hidden at the computing device 102, and an indication of this user input is provided as the sensitive content display indication 212. In response to a user input requesting to hide sensitive content, the modules 202, 204, 206, and 208 operate to hide sensitive content based on whether other people are around an authenticated user as discussed in more detail below. Other user inputs can also be received, such as a user input requesting to show all content (in which case the modules 202, 204, 206, and 208 do not operate to hide sensitive content), or a request to show no content (in which case the modules 202, 204, 206, and 208 operate to display no content regardless of whether the content is sensitive content).

Figure 3:
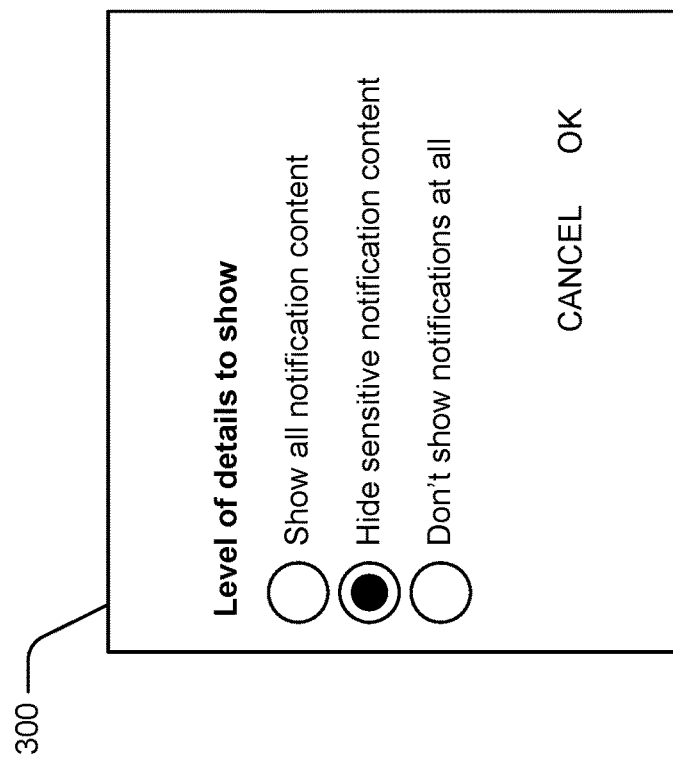
FIG. 3 illustrates an example user interface via which user inputs indicating whether sensitive content is to be hidden can be received.

FIG. 3 illustrates an example user interface 300 via which user inputs indicating whether sensitive content is to be hidden can be received. With the example user interface 300 a user can specify what notifications are to be displayed on a lock screen of the computing device 102. Multiple content display options are displayed in the user interface 300 with radio buttons allowing the user to select one display option. The display options include "Show all notification content", user selection of which causes the sensitive content display control system 118 to display all notifications on the lock screen (and not hide sensitive content). The display options also include a "Hide sensitive notification content", user selection of which causes the sensitive content display control system 118 to hide sensitive content (in this example the sensitive content is notifications). The display options also include a "Don't show notifications at all", user selection of which causes the sensitive content display control system 118 to display no notifications on the lock screen (regardless of whether the notifications are sensitive content).

Returning to FIG. 2, the person presence detection module 202 implements functionality to determine whether a user is present at the display 104 of the computing device 102. The person presence detection module 202 can rely on various different sensors and apply any of a variety of different public or proprietary techniques to determine whether a user is present at the display 104. In one or more embodiments, the person presence detection module 202 uses an IR sensor to detect a person in front of the display 104. Additionally or alternatively, the person presence detection module 202 can detect that a person is present at the display 104, such as detecting that a person is present in response to user input to the computing device 102 (e.g., pressing a button to activate the display 104 or touching the display 104, which is sensed by the under-display sensor). The person presence detection module 202 provides a person presence indication 214 to the user recognition module 204 indicating whether the person presence detection module 202 determined that a user is present at the display 104.

The user recognition module 204 implements functionality to, in response to the person presence indication 214 indicating that a user is present at the display 104, attempt to authenticate the user. In one or more embodiments, the user recognition module 204 activates a camera (e.g., an image capture device that is a sensor 116), which can be a front-facing camera (e.g., so person's face is visible to the camera when the user is looking at the display 104), a 360-degree camera, and so forth.

The user recognition module 204 determines whether the user present at the display 104 is an authorized user of the computing device 102. An authorized user of the computing device 102 refers to a user that is deemed by the computing device 102 as being permitted to access the computing device 102 (e.g., a user having an account on the computing device 102, a user that is an owner of the computing device 102, and so forth). The user recognition module 204 can use any of a variety of public or proprietary techniques to authenticate the user, such as face recognition, iris recognition, voice recognition, fingerprint recognition, other biometric authentication techniques, and so forth.

In one or more implementations, the user recognition module 204 authenticates the user by performing face recognition using an image capture device and depth sensor. Using face recognition (or other types of biometric authentication, such as iris recognition) allows the user recognition module 204 to authenticate the user by having the user simply look at the display 104. The user need not input any additional voice or manual inputs to the computing device 102. Rather, the user can simply look at the computing device 102 and the sensitive content display control system 118 automatically determines that a user is looking at the computing device 102 and that the user is an authorized user of the computing device 102.

The user recognition module 204 outputs a user recognition indication 216 indicating whether the user is an authorized user of the computing device 102. The user recognition indication 216 is provided to both the additional people presence detection module 206 and the content display control module 208.

The additional people presence detection module 206 implements functionality to determine whether there are one or more additional people (people other than the user) present at the computing device 102, and whether those additional people are looking at the display 104. In one or more implementations, the additional people presence detection module 206 determines whether there are one or more additional people present at the computing device 102 in response to the user recognition indication 216 indicating that the user is an authorized user of the computing device 102 and the sensitive content display indication 212 indicating whether sensitive content is to be hidden at the computing device 102. The additional people presence detection module 206 can determine whether there are one or more additional people present at the computing device 102 in various different manners, such as based on image capture, audio capture, thermal sensors, proximity sensors, and so forth.

If there no additional people present at the computing device 102, then the additional people presence detection module 206 outputs the additional people presence indication 218 indicating that there are not one or more additional people present at the computing device 102. However, if there is at least one additional person present at the computing device 102, then the additional people presence detection module 206 uses one or more additional sensors to determine whether the additional one person is looking at the display 104. The additional people presence detection module 206 then outputs the additional people presence indication 218 indicating the result of that determination. Thus, the additional people presence detection module 206 uses a multi-level detection technique to determine whether there are any additional people present at the computing device 102 and that are looking at the display 104. Using this multi-level detection technique allows the computing device 102 to conserve power by not activating or powering on certain sensors unless used to perform the later stage.

The additional people presence detection module 206 uses one or more of various different sensors to determine whether one or more additional people are present at the computing device 102. In one or more embodiments, the additional people presence detection module 206 captures audio (e.g., from the microphone 106) at the computing device 102. The additional people presence detection module 206 uses any of a variety of public or proprietary techniques to analyze the captured audio and determine whether multiple users' voices are captured. If multiple users' voices are captured then there are one or more additional people present at the computing device 102. However, if multiple users' voices are not captured then there are not one or more additional people present at the computing device 102.

Additionally or alternatively, the additional people presence detection module 206 uses proximity sensors to determine whether multiple people are present at the computing device. Proximity sensors detect how many objects that may be people are in close proximity to the computing device 102. For example, thermal sensors that detect the presence of objects with a human temperature within a particular range, such as 6-10 feet, can be used to determine whether multiple people are present at the computing device.

If there is at least one additional person present at the computing device 102, then the additional people presence detection module 206 uses one or more additional sensors to determine whether the additional one person is looking at the display 104. In one or more embodiments, these additional sensors are an image capture device, such as a front-facing camera (a camera that can capture images of people looking at the display 104), a 360-degree camera, and so forth. The additional people presence detection module 206 uses any of a variety of public or proprietary techniques to analyze the captured image(s) and determine whether multiple users are looking at the display 104. For example, the additional people presence detection module 206 identifies whether multiple faces are looking at the display 104, whether more than two eyes are looking at the display 104, and so forth. If the captured image(s) from the front-facing view of the computing device 104 includes multiple faces or more than two eyes, then the additional people presence detection module 206 determines that there are one or more additional people (in addition to the authenticated user) looking at the computing device display 104.

The additional people presence detection module 206 outputs an additional people presence indication 218 indicating whether there are one or more additional people looking at the display 104. Optionally, the additional people presence indication 218 also indicates whether there are one or more additional people present at the computing device 102 (regardless of whether those one or more additional people are looking at the display 104).

The content display control module 208 implements functionality to determine whether to display sensitive content. The content display control module 208 displays content 220 as appropriate based on the sensitive content display indication 212 and the determination of the content display control module 208 regarding whether to display sensitive content.

The content display control module 208 determines whether to display sensitive content based on the user recognition indication 216 and, in certain circumstances, the person presence indication 218. In response to the user recognition indication 216 indicating that the user is not an authorized user, the content display control module 208 does not display sensitive content. In response to both the user recognition indication 216 indicating that the user is an authorized user and the additional people presence indication 218 indicating that there are one or more additional people looking at the display 104, the content display control module 208 hides the sensitive content. The content display control module 208 hides the sensitive content by, for example, not displaying the sensitive content. However, the content display control module 208 optionally displays an indication that sensitive content for display exists (e.g., an indication that a notification has been received, an indication of the type of notification (e.g., notification of an email, instant message, social media update, etc.) is optionally displayed). In response to both the user recognition indication 216 indicating that the user is an authorized user and the additional people presence indication 218 indicating that there are not one or more additional people looking at the display 104, the content display control module 208 displays the sensitive content.

The sensitive content display control system 118 can display the sensitive content for various amounts of time. In one or more embodiments, the user recognition module 204 continues to authenticate the user at regular or irregular intervals (e.g., 5 seconds) and continues to display the sensitive content for as long as the user is authenticated (and optionally as long as the additional people presence indication 218 indicates that there are not one or more additional people looking at the display 104). The user recognition module 204 then hides the sensitive content if the user is no longer authenticated (or optionally if there are one or more additional people looking at the display 104). Additionally or alternatively, the sensitive content display control system 118 displays the sensitive content for a threshold amount of time (e.g., 5 or 10 seconds), then hides the sensitive content. Various different thresholds can be implemented (and optionally can be user configurable) and are selected so that the user has sufficient time to consume (e.g., read) the sensitive content before hiding the sensitive content. Additionally or alternatively, the sensitive content display control system 118 can display a "dismiss" option (e.g., the word "dismiss", an icon, a button, etc.) and hides the sensitive content in response to user input selecting the "dismiss" option.

In one or more embodiments, the sensitive content display control system 118 determines whether to display sensitive content in response to a user being present at the display 104. Furthermore, the sensitive content display control system 118 can repeat this determination at various intervals or in response to various different events. For example, at regular or irregular intervals the sensitive content display control system 118 can again determine whether to display sensitive content, including determining whether a user is present at the display 104, determining whether a user present at the display 104 is an authorized user, and determining whether additional people are looking at the display 104. The sensitive content display control system 118 then displays content 220 in accordance with the newly made determinations.

Repeating these determinations allows the sensitive content display control system 118 to adapt to changes. For example, the sensitive content display control system 118 may initially determine that no other people are looking at the display 104, so sensitive content is displayed. However, if the sensitive content display control system 118 subsequently determines that one or more additional people are looking at the display 104, the sensitive content is then hidden. By way of another example, the sensitive content display control system 118 may initially determine that one or more additional people are looking at the display 104, so the sensitive content is hidden. However, if the sensitive content display control system 118 subsequently determines that no other people are looking at the display 104, sensitive content is then displayed.

The user recognition module 204 determines whether the user present at the display 104 is an authorized user of the computing device 102. Detecting that the user present at the display 104 is an authorized user results in allowing sensitive content to be displayed by the content display control module 208 in certain circumstances as discussed above. In one or more embodiments, this authentication of the user does not unlock the computing device 102. Rather, an additional authentication is performed using different authentication information and the computing device 102 is unlocked if this additional authentication indicates the user present at the display 104 is an authorized user of the computing device 102. This additional authentication can be performed by the user recognition module 204 or another system or module of the computing device 102 (e.g., a program included in the operating system 112).

Once the computing device 102 is unlocked the user has full access to the computing device 102. Sensitive content can be displayed without regard for whether other people are looking at the display 104. The sensitive content display control system 118 assumes that if the user unlocks the computing device 102 that the user is aware of his or her surroundings and is comfortable having whatever content he or she desires displayed. Additionally, in one or more embodiments the computing device 102 transitions from the low power mode to a higher power mode in response to being unlocked. In the higher power mode one or more power conserving techniques implemented in the low power mode are reversed as discussed above.

Two different authentication mechanisms are used to authenticate a user: one is used to allow sensitive content to be displayed by the content display control module 208 in certain circumstances as discussed above, and the other is used to unlock the computing device 102. Each authentication mechanism uses different authentication information (e.g., images, audio, fingerprints, alphanumeric inputs, and so forth). For example, the authentication mechanism to allow sensitive content to be displayed by the content display control module 208 may be a face recognition system that uses images of faces to authenticate the user, an iris recognition system that uses images of eyes to authenticate the user, a fingerprint recognition system that uses fingerprints scanned or otherwise sensed by a under-display sensor to authenticate the user, and so forth. The authentication mechanism to unlock the computing device 102 may be a password or PIN verification system that uses alphanumeric inputs to authenticate the user, a fingerprint recognition system that uses fingerprints scanned or otherwise sensed using another sensor to authenticate the user, and so forth.

The techniques discussed herein provide a convenient and easy way to allow users to keep sensitive content on their computing devices private. For example, assume a device owner's computing device is sitting on a table or counter and a notification that is sensitive content is received from an application or program (e.g., a text message from the owner's wife). If the owner picks up the computing device and no one else is looking at the computing device display, then the notification that is sensitive content is displayed. However, if someone else picks up the computing device, or the owner picks up the computing device and one or more other people can see the computing device display, then the notification that is sensitive content is not displayed.

FIGS. 4-8 each illustrate example user interfaces that may be displayed by the computing device 102 using the techniques discussed herein. In the examples of FIGS. 4-8, the computing device is operating in a low power mode in a low power mode using various power conserving techniques, such as having only certain portions of the computing device display powered or activated. Those portions are the portions in which the status information, selectable items (e.g., icons, buttons), and notifications (or indications of hidden contents) are displayed.

Figure 4:
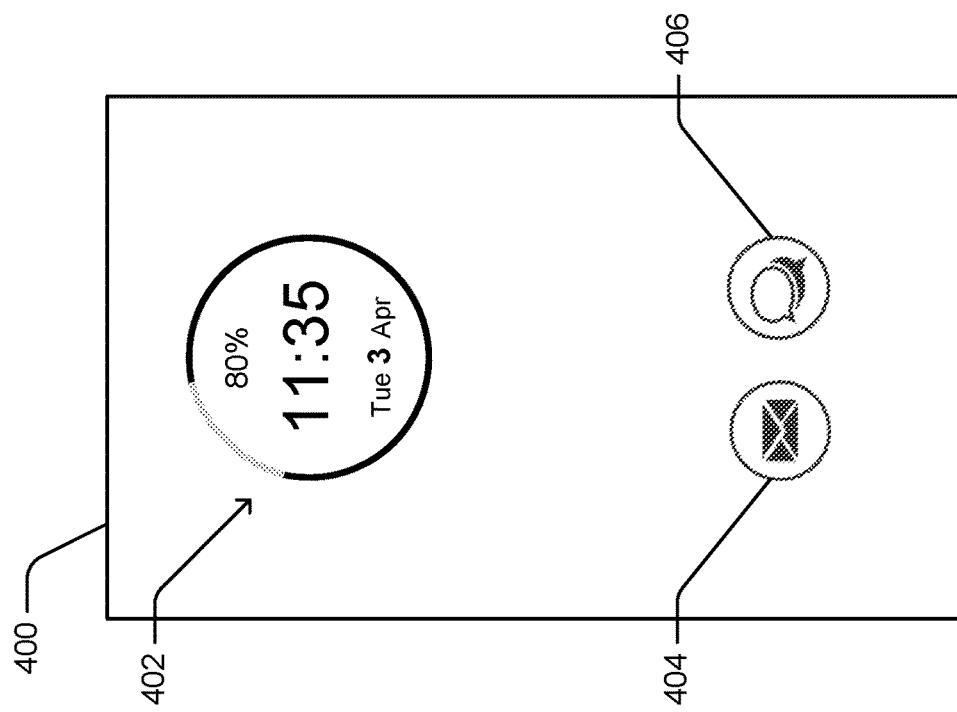
FIGS. 4, 5, 6, 7, and 8 each illustrate example user interfaces that may be displayed by the computing device using the techniques discussed herein.

FIG. 4 illustrates an example lock screen 400. The lock screen 400 includes a status display portion 402, which displays a current time, date, and an indication of battery life remaining. The lock screen 400 also includes selectable items that are a mail icon 404 that is selectable to allow corresponding sensitive content in the form of email notifications to be displayed, and a messaging icon 406 that is selectable to allow corresponding sensitive content in the form of messaging (e.g., text messaging) notifications to be displayed. The mail icon 404 and the messaging icon 406 can each be displayed in two different manners, one indicating that a notification is ready to be displayed and another indicating that a notification is not ready to be displayed. For example, the messaging icon 406 can be displayed brighter, in a different color, animated, and so forth if a messaging notification is ready to be displayed.

Figure 5:
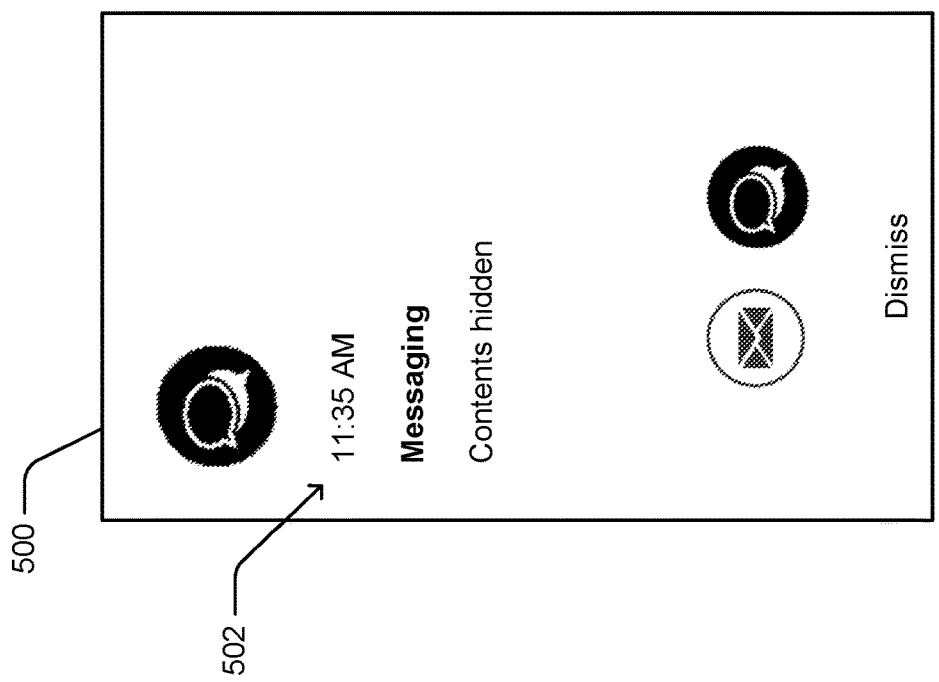

FIG. 5 illustrates an example lock screen 500. The lock screen 500 is displayed in response to user selection of the messaging icon 406 on the lock screen 400 as well as the user not being an authorized user of the computing device (or the user recognition module 204 being in the process of authenticating the user). An indication 502 is displayed indicating that sensitive content is not being displayed.

Figure 6:
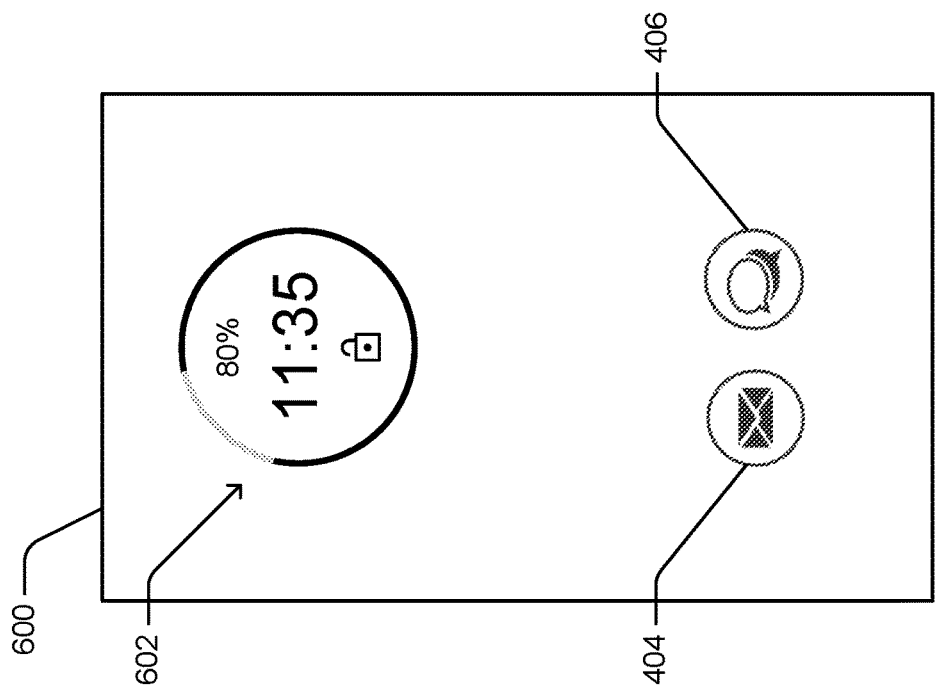

FIG. 6 illustrates an example lock screen 600. The lock screen 600 is similar to the lock screen 400 of FIG. 4, but is a lock screen 600 displayed in response to a user having been authenticated by the user recognition module 204. The lock screen 600 includes a status display portion 602, which displays a current time and an indication of battery life remaining. The status display portion 602 also displays an indication (shown as an open padlock) that the user has been authenticated by the user recognition module 204 and that one or more additional people looking at the computing device display have not been detected. This informs the user that, for example, he or she can select one of the icons 404 or 406 and have sensitive content displayed.

Figure 7:
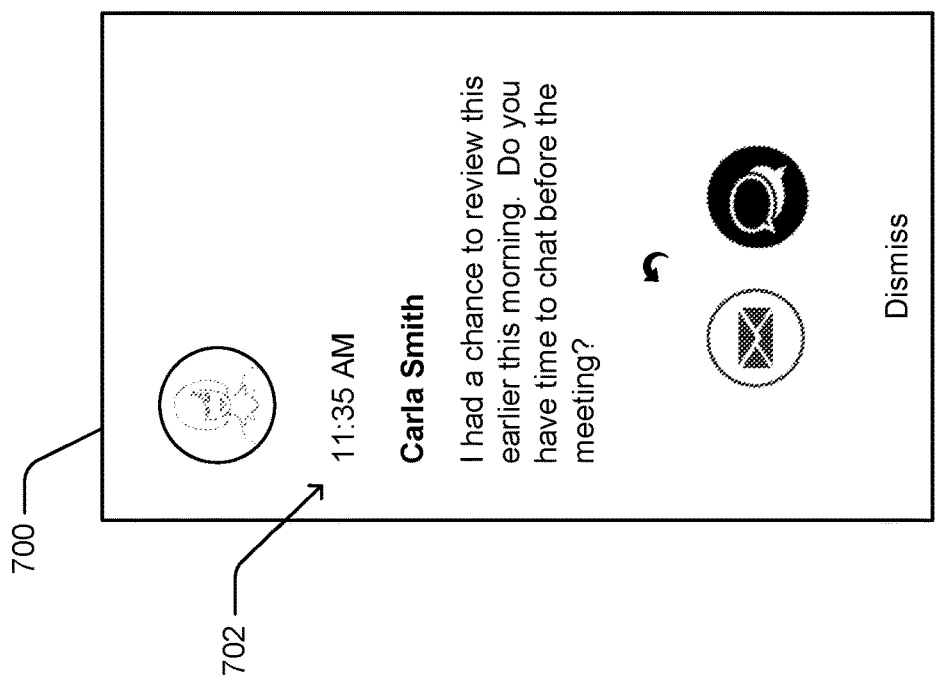

FIG. 7 illustrates an example lock screen 700. The lock screen 700 is displayed in response to user selection of the messaging icon 406 on the lock screen 400 or 600 as well as the user being an authorized user of the computing device and one or more additional people looking at the computing device display not having been detected. The messaging notification 702 is displayed because the user is an authorized user of the computing device and one or more additional people looking at the computing device display have not been detected.

Figure 8:
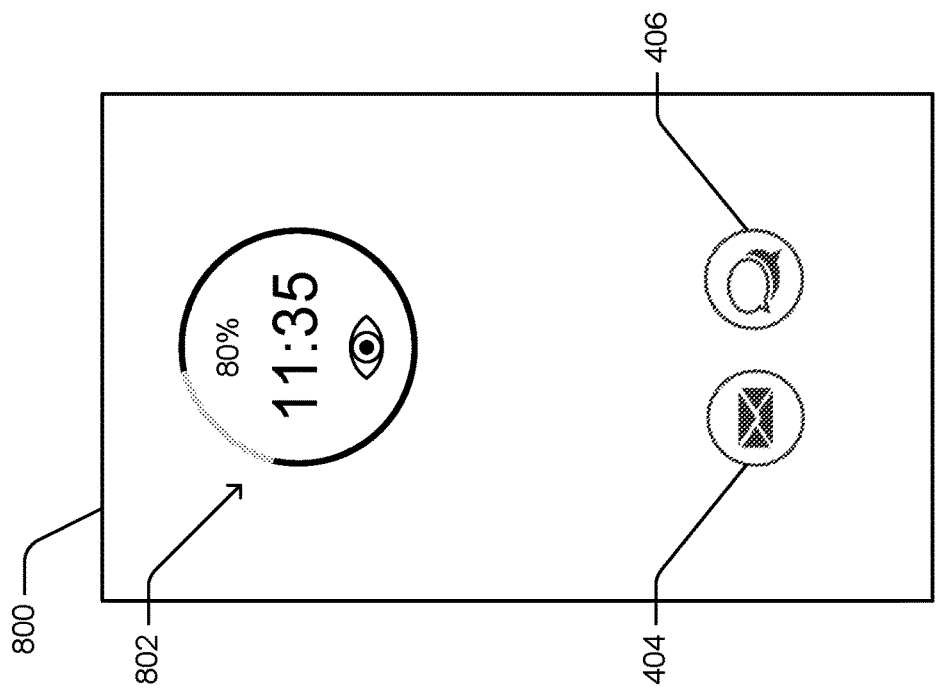

FIG. 8 illustrates an example lock screen 800. The lock screen 800 is similar to the lock screen 400 of FIG. 4, but is a lock screen 800 displayed in response to a user having been authenticated by the user recognition module 204. The lock screen 800 includes a status display portion 802, which displays a current time and an indication of battery life remaining. The status display portion 802 also displays an indication (shown as an eye) that the user has been authenticated by the user recognition module 204 but that one or more additional people looking at the computing device display have been detected. This informs the user that, for example, sensitive content will not be displayed. If the user were to select one of the icons 404 or 406, a lock screen is displayed indicating that sensitive content is not being displayed (e.g., the lock screen 500 of FIG. 5).

Returning to FIG. 1, in one or more embodiments, the sensors 116 include an under-display sensor. The under-display sensor can be any of various sensors, such as sensors that detect a user touching the display 104 or that detect a user being within a threshold distance, such as 1 centimeter, of the display 104. For example, the under-display sensor can be a fingerprint sensor that captures data describing a fingerprint of a user, a fingerprint sensor that captures data describing fingerprints of multiple different fingers of the user, sensors that capture data describing locations where fingers are touching (or are within a threshold distance of) the display 104, and so forth. This captured data is used as authentication information for the user recognition module 204 to authenticate the user.

Figure 9:
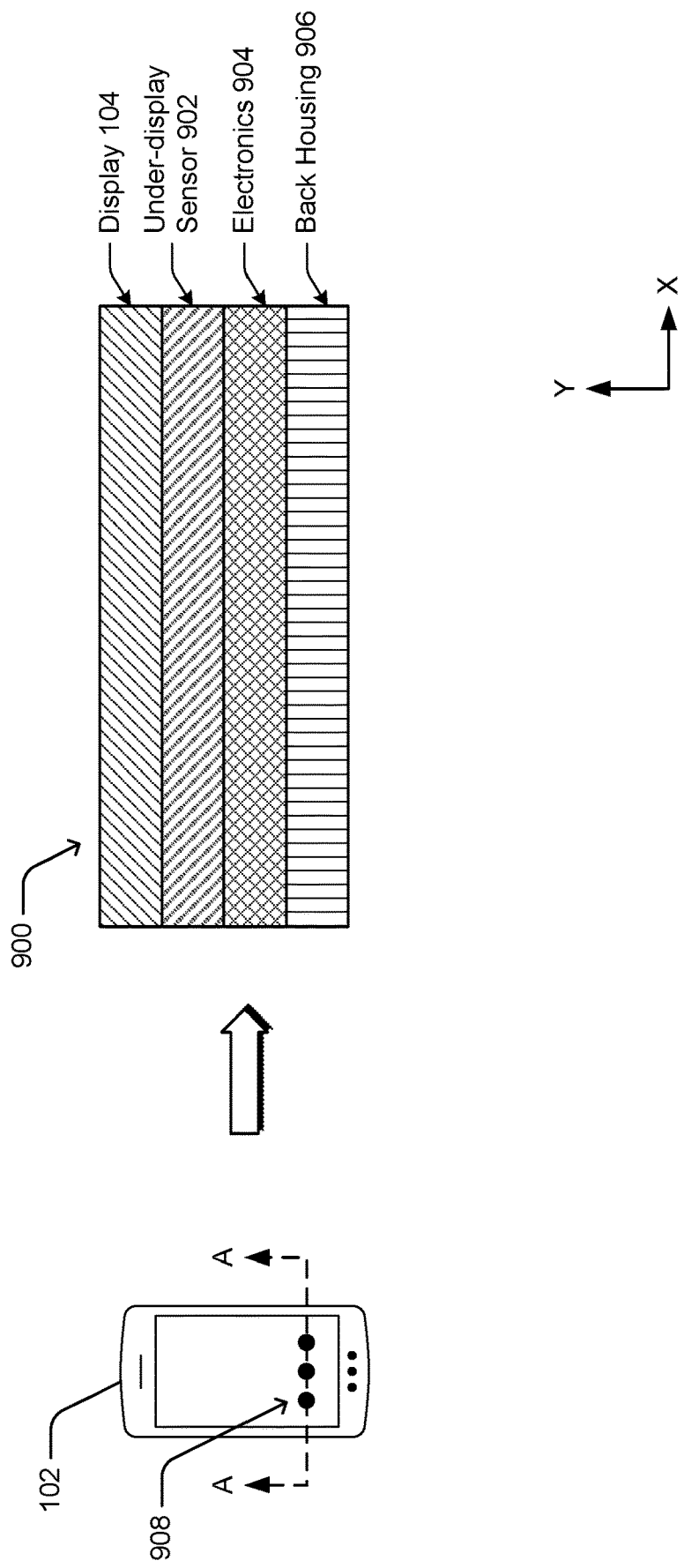
FIG. 9 shows an example cross-sectional view of a computing device.

FIG. 9 shows an example cross-sectional view 900 of a computing device 102. The cross-sectional view 900 is a cross-sectional view of the computing device 102 along the dashed line A. As illustrated, the cross-sectional view 900 includes four layers: the display 104, an under-display sensor 902, electronics 904, and a back housing 906. The display 104, the under-display sensor 902, the electronics 904, and the back housing 906 are along an axis (y-axis). The face of the computing device 102, including the display 104, is the topmost layer of the computing device 102. As illustrated, the y-axis is perpendicular to a face of the computing device 102. Although illustrated as having the same dimensions, it should be noted that different ones of the display 104, the under-display sensor 902, the electronics 904, and the back housing 906 can have different dimensions (e.g., heights or thicknesses along the y-axis).

From bottom to top, the computing device 102 includes the back housing 906, the electronics 904, the under-display sensor 902, and the display 104. The back housing 906 is a support structure or housing for the computing device 102. The electronics 904 include various hardware components, such as integrated circuits, storage devices, and so forth. The under-display sensor 902, as illustrated, is below or underneath the display 104.

It should be noted that the dashed line A cuts through icons 908. Each of the icons 908 is a selectable item that is selectable by the user to allow corresponding sensitive content in the form of notifications (e.g., email notifications, messaging (e.g., text messaging) notifications, social media notifications, etc.) to be displayed. Accordingly, as illustrated by the cross-sectional view 900, the under-display sensor 902 is situated below the display 104 at locations corresponding to locations where the icons 908 are displayed.

Returning to FIG. 2, the user recognition module 204 of the sensitive content display control system 118 uses the under-display sensor to determine whether the user present at the computing device display is an authorized user of the computing device. The under-display sensor can be used in various manners to determine whether the user is an authorized user, such as by comparing the authentication information obtained by the under-display sensor to a known or stored authentication information for the user. If the authentication information obtained by the under-display sensor is the same as (or within a threshold amount of being the same as, such as 90%) the known or stored authentication information for the user, then the user recognition module 204 determines that the user present at the computing device is an authorized user of the computing device. However, if the authentication information obtained by the under-display sensor is not the same as (or is not within a threshold amount of being the same as, such as 90%) the known or stored authentication information for the user, then the user recognition module 204 determines that the user present at the computing device is not an authorized user of the computing device.

The content display control module 208 determines whether to display sensitive content based on the user recognition indication 216. In response to the user recognition indication 216 indicating that the user is not an authorized user, the content display control module 208 does not display sensitive content. In response to the user recognition indication 216 indicating that the user is an authorized user, the content display control module 208 displays the sensitive content. The content display control module 208 hides the sensitive content by, for example, not displaying the sensitive content. However, the content display control module 208 optionally displays an indication that sensitive content for display exists (e.g., an indication that a notification has been received, an indication of the type of notification (e.g., notification of an email, instant message, social media update, etc.) is optionally displayed). In response to the user recognition indication 216 indicating that the user is an authorized user, the content display control module 208 displays the sensitive content.

In one or more embodiments, the sensitive content display control system 118 determines whether to display sensitive content in response to a user being present at the display 104. Furthermore, the sensitive content display control system 118 can repeat this determination at various intervals or in response to various different events. For example, at regular or irregular intervals the sensitive content display control system 118 can again determine whether to display sensitive content, including determining whether a user is present at the display 104 and determining whether a user present at the display 104 is an authorized user. The sensitive content display control system 118 then displays content 220 in accordance with the newly made determinations.

The user recognition module 204 determines whether the user present at the display 104 is an authorized user of the computing device 102. Detecting that the user present at the display 104 is an authorized user results in allowing sensitive content to be displayed by the content display control module 208 in certain circumstances as discussed above. In one or more embodiments, this authentication of the user does not unlock the computing device 102. Rather, an additional authentication is performed using different authentication information and the computing device 102 is unlocked if this additional authentication indicates the user present at the display 104 is an authorized user of the computing device 102. This additional authentication can be performed by the user recognition module 204 or another system or module of the computing device 102 (e.g., a program included in the operating system 112).

In one or more embodiments, in situations in which the under-display sensor is used to determine whether the user present at the computing device display is an authorized user of the computing device, the sensitive content display control system 118 need not include the additional people presence detection module 206. Rather, the sensitive content display control system 118 can assume that since the user was authenticated by the user recognition module 204 based on the under-display sensor, the user desires to have the sensitive content displayed. For example, the sensitive content display control system 118 can assume that the user would not have touched a selectable item corresponding to sensitive content with his or her finger (and exposing his or her fingerprint to the sensitive content display control system 118) unless the user desired to view the sensitive content.

Additionally or alternatively, the under-display sensor can be used in conjunction with the additional people presence detection module 206. For example, the user recognition module 204 can use the under-display sensor to authenticate a user, and the content display control module 208 determines whether to display sensitive content based on the user recognition indication 216 and the additional people presence indication 218 as discussed above.

Figure 11:
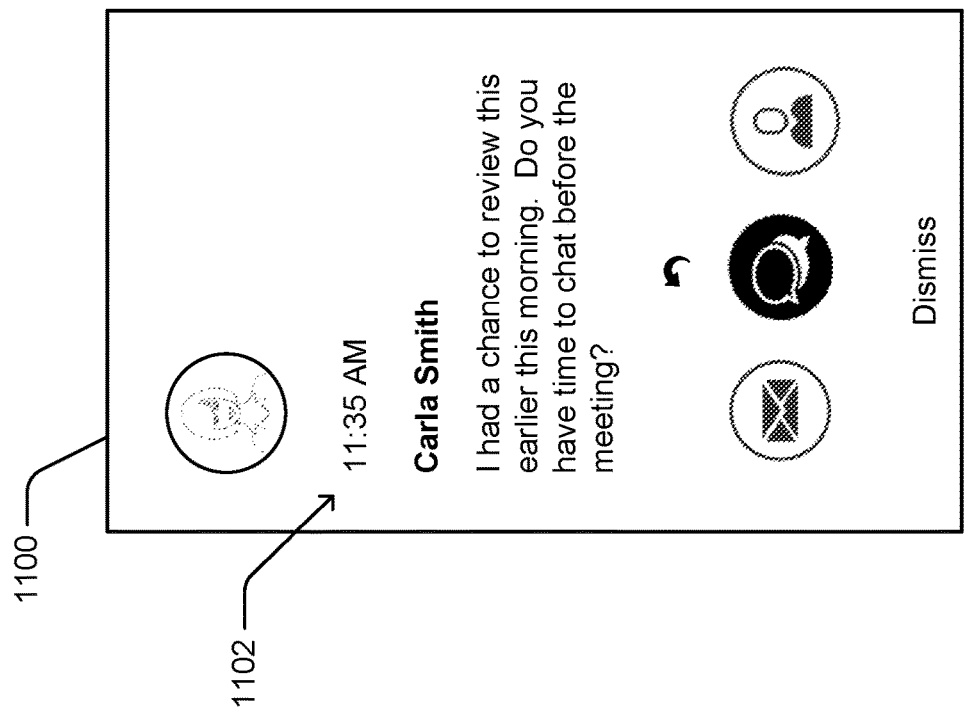
FIGS. 10, 11, and 12 each illustrate example user interfaces that may be displayed by the computing device using the techniques discussed herein.
Figure 10:
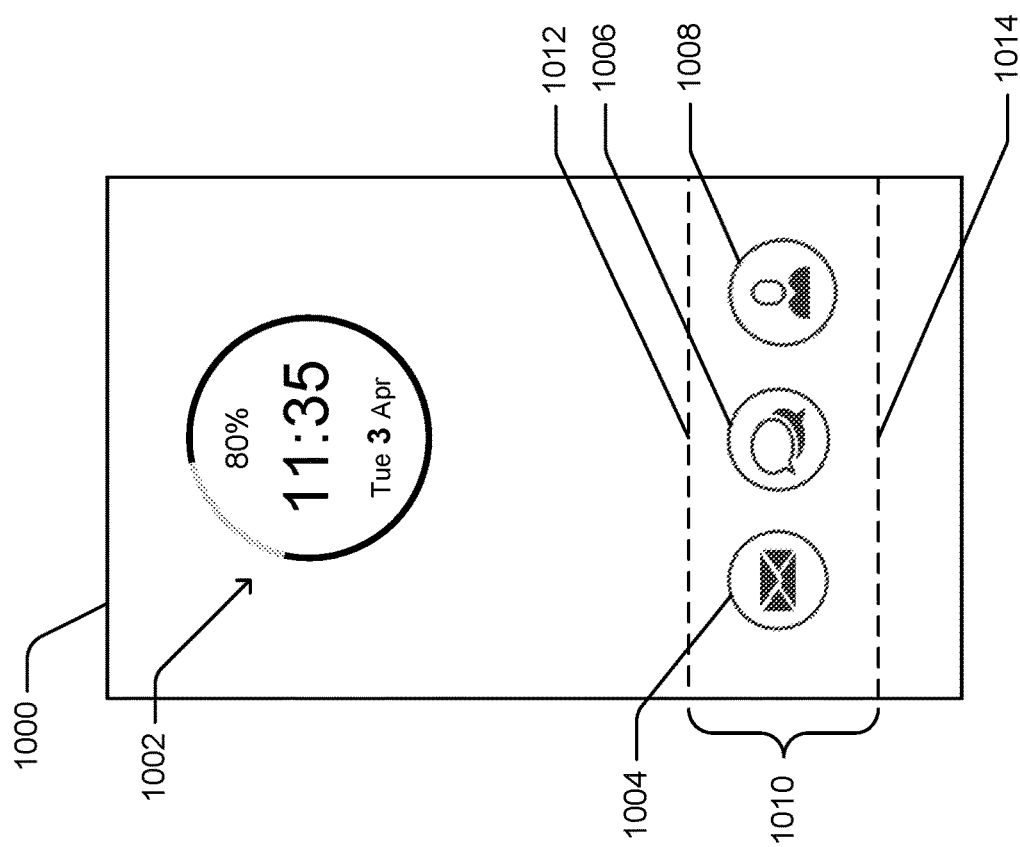
Figure 12:
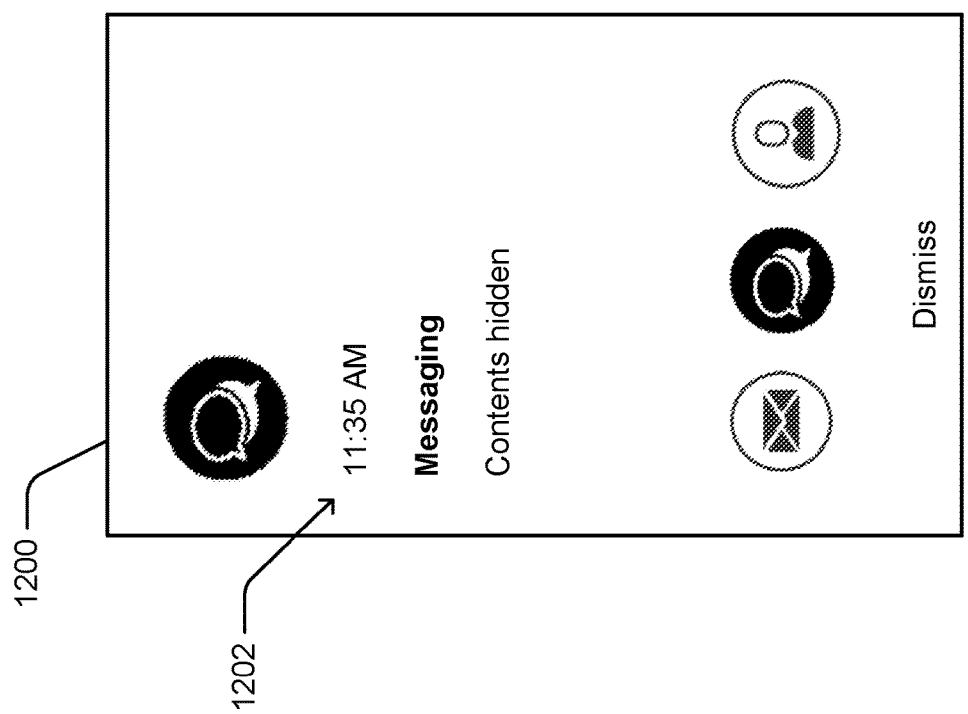

FIGS. 10-12 each illustrate example user interfaces that may be displayed by the computing device 102 using the techniques discussed herein. In the examples of FIGS. 10-12, the computing device is operating in a low power mode using various power conserving techniques, such as having only certain portions of the computing device display powered or activated. Those portions are the portions in which the status information, selectable items (e.g., icons, buttons), and notifications (or indications of hidden contents) are displayed.

FIG. 10 illustrates an example lock screen 1000. The lock screen 1000 includes a status display portion 1002, which displays a current time, date, and an indication of battery life remaining. The lock screen 1000 also includes selectable items that are a mail icon 1004 that is selectable to allow corresponding sensitive content in the form of email notifications to be displayed, a messaging icon 1006 that is selectable to allow corresponding sensitive content in the form of messaging (e.g., text messaging) notifications to be displayed, and a social media icon 1008 that is selectable to allow corresponding sensitive content in the form of social media notifications to be displayed. The mail icon 1004, the messaging icon 1006, and the social media icon 1008 can each be displayed in two different manners, one indicating that a notification is ready to be displayed and another indicating that a notification is not ready to be displayed. For example, the messaging icon 1006 can be displayed brighter, in a different color, animated, and so forth if a messaging notification is ready to be displayed.

The icons 1004, 1006, and 1008 are displayed in locations on the display so that they are situated above the under-display sensor. Accordingly, if the user selects one of the icons 1004, 1006, or 1008 (e.g., touches the icon with his or her finger), then the under-display sensor can authenticate the user (e.g., authenticate his or her fingerprint).

In the example lock screen 1000, the under-display sensor is illustrated as a rectangular strip 1010 by dashed lines 1012 and 1014. However, it should be noted that the size and shape of the under-display sensor can vary. For example, the under-display sensor can be just circular regions situated below where the icons 1004, 1006, and 1008 are displayed, the under-display sensor can be situated under the lower half of the display, the under-display sensor can be situated under the entire display, and so forth.

FIG. 11 illustrates an example lock screen 1100. The lock screen 1100 is displayed in response to user selection of the messaging icon 1006 on the lock screen 1000 as well as the user being an authorized user of the computing device. The messaging notification 1102 (the sensitive content) is displayed because the user is an authorized user of the computing device as determined based on the under-display sensor.

FIG. 12 illustrates an example lock screen 1200. The lock screen 1200 is displayed in response to user selection of the messaging icon 1006 on the lock screen 1000 as well as the user not being an authorized user of the computing device (or the user recognition module 204 being in the process of authenticating the user). An indication 1202 is displayed indicating that sensitive content is not being displayed.

Figure 13:
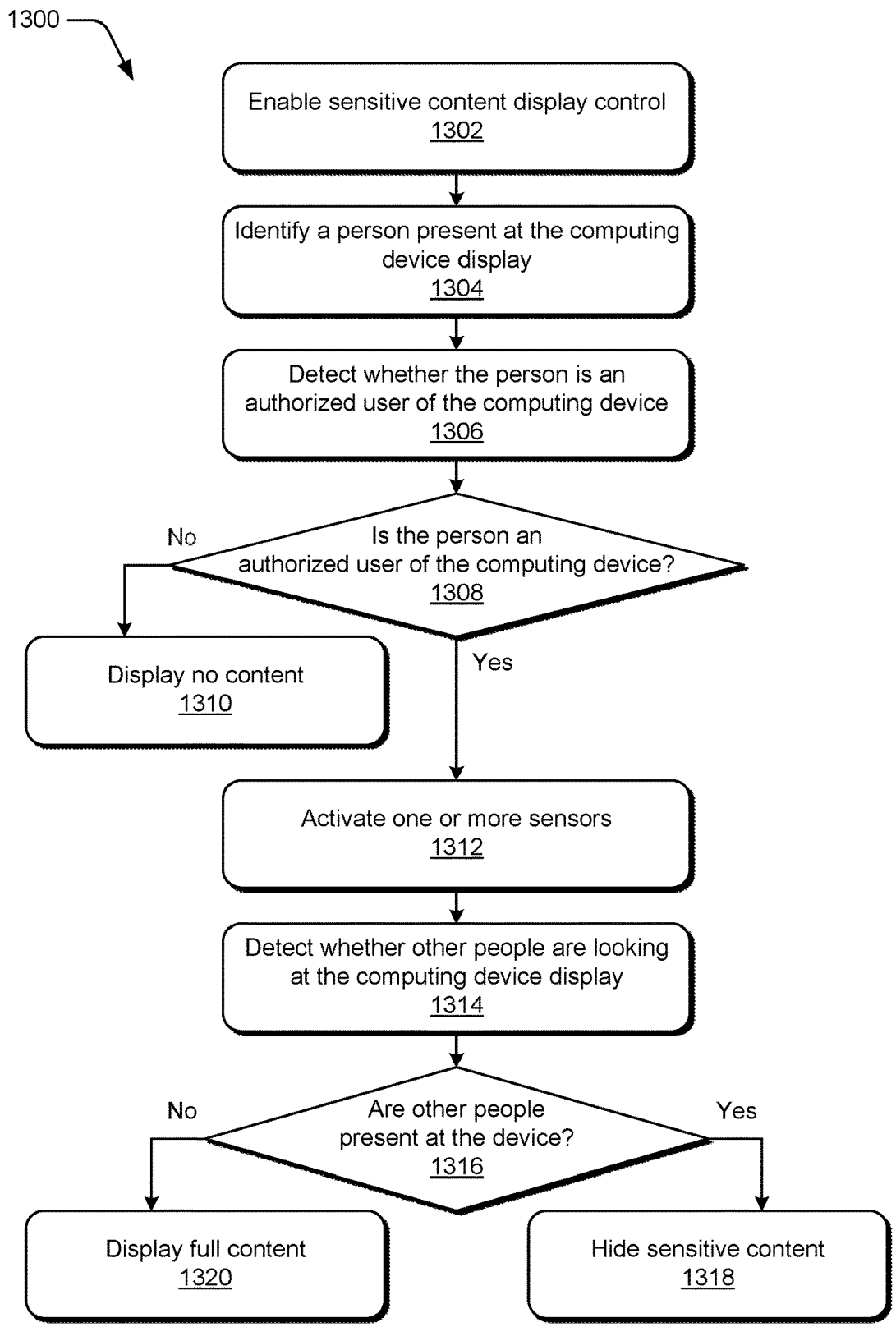
FIG. 13 illustrates an example process for implementing the techniques discussed herein in accordance with one or more embodiments.

FIG. 13 illustrates an example process 1300 for implementing the techniques discussed herein in accordance with one or more embodiments. Process 1300 is carried out by a sensitive content display control system, such as the sensitive content display control system 118 of FIG. 1 or FIG. 2, and can be implemented in software, firmware, hardware, or combinations thereof. Process 1300 is shown as a set of acts and is not limited to the order shown for performing the operations of the various acts.

In process 1300, sensitive content display control is enabled (act 1302). The sensitive content display control can be enabled in response to a user request indicating to hide sensitive content. Additionally or alternatively, the sensitive content display control can be enabled in other manners, such as by default.

A person being present at the computing device display is identified (act 1304). The person being present can be identified in various manners, such as the user coming close to (e.g., within 10 feet) of the computing device and looking at the computing device display, a user's hand being close to (e.g., within 2 feet) of the computing device, and so forth.

Whether the person present at the computing device display is an authorized user of the computing device is detected (act 1306). This detection can be performed in various manners as discussed above, such as using biometric authentication.

Process 1300 then proceeds based on whether the person present at the computing device display is an authorized user of the computing device (act 1308). If the person present at the computing device display is not an authorized user of the computing device, then no content is displayed (act 1310). No sensitive content is displayed. Furthermore, additional content (e.g., notifications that are not sensitive content) is also not displayed because the person is not an authorized user of the computing device.

However, if the person present at the computing device display is an authorized user of the computing device, then one or more sensors are activated (act 1312). These sensors allow a determination to be made as to whether one or more additional people (one or more people in addition to the authorized user) are present at the computing device display, and optionally whether one or more additional people (one or more people in addition to the authorized user) are looking at the computing device display.

Whether one or more people additional people are looking at the computing device display is detected (act 1314). If one or more additional people are not present at the computing device display, or one or more additional people are not looking at the computing device display, then one or more additional people are not looking at the computing device display. Otherwise, one or more additional people are detected as looking at the computing device display.

Process 1300 then proceeds based on whether one or more additional people are detected as looking at the computing device display (act 1316). If one or more additional people are detected as looking at the computing device display then sensitive content is hidden (act 1318). Sensitive content is hidden, for example, by not displaying the sensitive content. However, if one or more additional people are not detected as looking at the computing device display then full content is displayed (act 1320). Displaying full content includes displaying sensitive content.

It should be noted that process 1300 can be performed while the computing device is operating in a low power mode. For example, only a portion of the computing device display is powered on or activated, such as an area of the computing device display in which the sensitive content is displayed. Other portions of the computing device display need not be powered on or activated, thereby reducing power consumption in the computing device.

Figure 14:
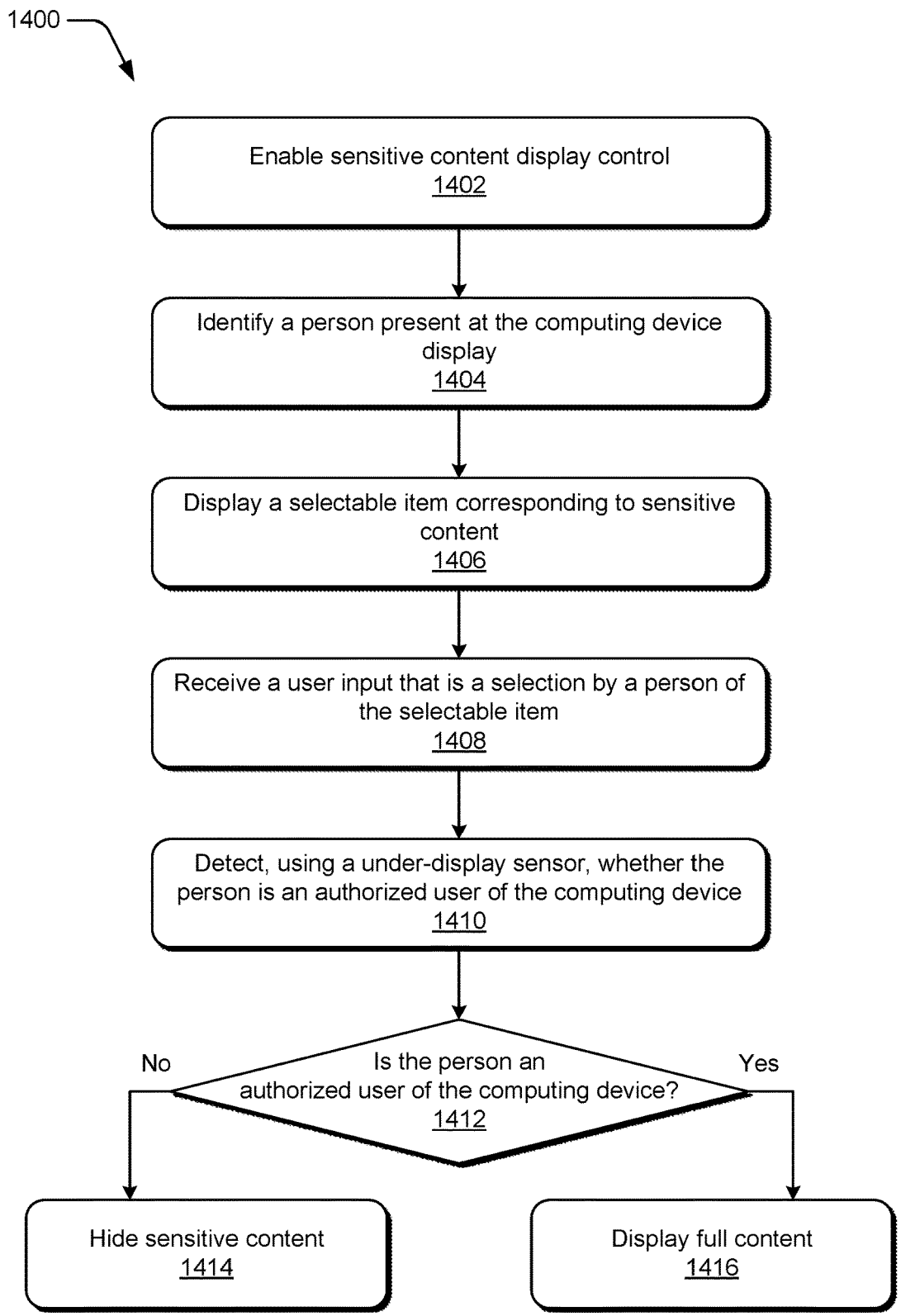
FIG. 14 illustrates another example process for implementing the techniques discussed herein in accordance with one or more embodiments.

FIG. 14 illustrates another example process 1400 for implementing the techniques discussed herein in accordance with one or more embodiments. Process 1400 is carried out by a sensitive content display control system, such as the sensitive content display control system 118 of FIG. 1 or FIG. 2, and can be implemented in software, firmware, hardware, or combinations thereof. Process 1400 is shown as a set of acts and is not limited to the order shown for performing the operations of the various acts.

In process 1400, sensitive content display control is enabled (act 1402). The sensitive content display control can be enabled in response to a user request indicating to hide sensitive content. Additionally or alternatively, the sensitive content display control can be enabled in other manners, such as by default.

A person being present at the computing device display is identified (act 1404). The person being present can be identified in various manners, such as the user coming close to (e.g., within 10 feet) of the computing device and looking at the computing device display, a user's hand being close to (e.g., within 2 feet) of the computing device, and so forth.

A selectable item corresponding to sensitive content is displayed (act 1406). The selectable item is a visual indication (e.g., an icons or button) displayed on a computing device display. For example, the selectable item can be a messaging icon that is selectable to allow messaging (e.g., text messaging) notifications to be displayed.

A user input that is a selection of the selectable item is received (act 1408). The user input is, for example, the user touching a portion of the computing device display where the selectable item is displayed with his or her finger.

Whether the person present at the computing device display is an authorized user of the computing device is detected using an under-display sensor (act 1410). This detection can be performed in various manners as discussed above, such as using fingerprint authentication.

Process 1400 then proceeds based on whether the person present at the computing device display is an authorized user of the computing device (act 1412). If the person present at the computing device display is not an authorized user of the computing device, then sensitive content is hidden (act 1414). Sensitive content is hidden, for example, by not displaying the sensitive content, although an indication that sensitive content exists can optionally be displayed.

However, if the person present at the computing device display is an authorized user of the computing device, then full content is displayed (act 1416). Displaying full content includes displaying sensitive content.

It should be noted that process 1400 can be performed while the computing device is operating in a low power mode. For example, only a portion of the computing device display is powered on or activated, such as an area of the computing device display in which the sensitive content and the selectable item are displayed. Other portions of the computing device display need not be powered on or activated, thereby reducing power consumption in the computing device.

Figure 15:
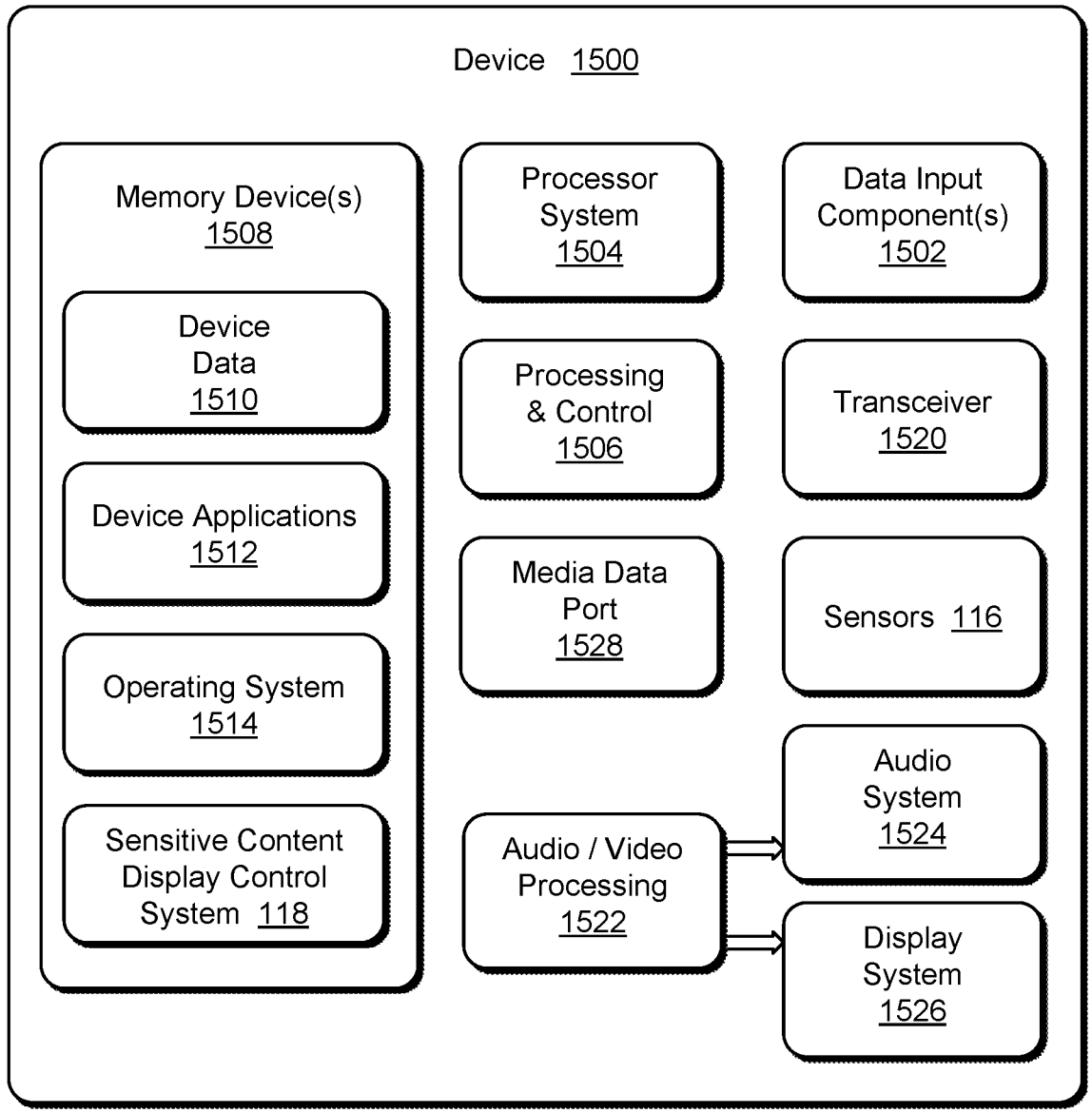
FIG. 15 illustrates various components of an example electronic device that can implement embodiments of the techniques discussed herein.

FIG. 15 illustrates various components of an example electronic device 1500 that can be implemented as a computing device as described with reference to any of the previous FIGS. 1-14. The device 1500 may be implemented as any one or combination of a fixed or mobile device in any form of a consumer, computer, portable, user, communication, phone, navigation, gaming, messaging, Web browsing, paging, media playback, or other type of electronic device.

The electronic device 1500 can include one or more data input components 1502 via which any type of data, media content, or inputs can be received such as user-selectable inputs, messages, music, television content, recorded video content, and any other type of audio, video, or image data received from any content or data source. The data input components 1502 may include various data input ports such as universal serial bus ports, coaxial cable ports, and other serial or parallel connectors (including internal connectors) for flash memory, DVDs, compact discs, and the like. These data input ports may be used to couple the electronic device to components, peripherals, or accessories such as keyboards, microphones, or cameras. The data input components 1502 may also include various other input components such as microphones, touch sensors, keyboards, and so forth.

The electronic device 1500 of this example includes a processor system 1504 (e.g., any of microprocessors, controllers, and the like) or a processor and memory system (e.g., implemented in a system on a chip), which processes computer executable instructions to control operation of the device 1500. A processor system 1504 may be implemented at least partially in hardware that can include components of an integrated circuit or on-chip system, an application specific integrated circuit, a field programmable gate array, a complex programmable logic device, and other implementations in silicon or other hardware. Alternatively or in addition, the electronic device 1500 can be implemented with any one or combination of software, hardware, firmware, or fixed logic circuitry implemented in connection with processing and control circuits that are generally identified at 1506. Although not shown, the electronic device 1500 can include a system bus or data transfer system that couples the various components within the device 1500. A system bus can include any one or combination of different bus structures such as a memory bus or memory controller, a peripheral bus, a universal serial bus, or a processor or local bus that utilizes any of a variety of bus architectures.

The electronic device 1500 also includes one or more memory devices 1508 that enable data storage such as random access memory, nonvolatile memory (e.g., read only memory, flash memory, erasable programmable read only memory, electrically erasable programmable read only memory, etc.), and a disk storage device. A memory device 1508 provides data storage mechanisms to store the device data 1510, other types of information or data (e.g., data backed up from other devices), and various device applications 1512 (e.g., software applications). For example, an operating system 1514 can be maintained as software instructions with a memory device and executed by the processor system 1504.

In one or more embodiments the electronic device 1500 includes a sensitive content display control system 118 and one or more sensors 116, described above. Although represented as a software implementation, the sensitive content display control system 118 may be implemented as any form of a voice input interpretation application, module, firmware that is installed on the device 1500, a hardware implementation of the modules, and so on.

Moreover, in one or more embodiments the techniques discussed herein can be implemented as a computer-readable storage medium having computer readable code stored thereon for programming a computing device (for example, a processor of a computing device) to perform a method as discussed herein. Computer-readable storage media refers to media and/or devices that enable persistent and/or non-transitory storage of information in contrast to mere signal transmission, carrier waves, or signals per se. Computer-readable storage media refers to non-signal bearing media. Examples of such computer-readable storage mediums include, but are not limited to, a hard disk, a CD-ROM, an optical storage device, a magnetic storage device, a ROM (Read Only Memory), a PROM (Programmable Read Only Memory), an EPROM (Erasable Programmable Read Only Memory), an EEPROM (Electrically Erasable Programmable Read Only Memory) and a Flash memory. The computer-readable storage medium can be, for example, memory devices 1508.

The electronic device 1500 also includes a transceiver 1520 that supports wireless and/or wired communication with other devices or services allowing data and control information to be sent as well as received by the device 1500. The wireless and/or wired communication can be supported using any of a variety of different public or proprietary communication networks or protocols such as cellular networks (e.g., third generation networks, fourth generation networks such as LTE networks), wireless local area networks such as Wi-Fi networks, and so forth.

The electronic device 1500 can also include an audio or video processing system 1522 that processes audio data or passes through the audio and video data to an audio system 1524 or to a display system 1526. The audio system or the display system may include any devices that process, display, or otherwise render audio, video, display, or image data. Display data and audio signals can be communicated to an audio component or to a display component via a radio frequency link, S-video link, high definition multimedia interface (HDMI), composite video link, component video link, digital video interface, analog audio connection, or other similar communication link, such as media data port 1528. In implementations the audio system or the display system are external components to the electronic device. Alternatively or in addition, the display system can be an integrated component of the example electronic device, such as part of an integrated touch interface.

Although embodiments of techniques for implementing displaying sensitive content based on authentication using an under-display sensor have been described in language specific to features or methods, the subject of the appended claims is not necessarily limited to the specific features or methods described. Rather, the specific features and methods are disclosed as example implementations of techniques for implementing displaying sensitive content based on authentication using an under-display sensor, and other equivalent features and methods are intended to be within the scope of the appended claims. Further, various different examples are described and it is to be appreciated that each described example can be implemented independently or in connection with one or more other described examples. Additional aspects of the techniques, features, and/or methods discussed herein relate to one or more of the following:

A method comprising: displaying, at a computing device, a selectable item corresponding to sensitive content; receiving a user input that is a selection by a person of the selectable item; detecting, in response to the user input and using an under-display sensor, whether the person is an authorized user of the computing device; and in response to the person being an authorized user of the computing device, displaying the sensitive content at the computing device.

Alternatively or in addition to the above described method, any one or combination of the following. The selectable item comprising an icon. The displaying the selectable item comprising displaying the selectable item in a location situated above the under-display sensor. The method further comprising in response to the person not being an authorized user of the computing device, hiding the sensitive content at the computing device. The hiding sensitive content at the computing device comprising not displaying the sensitive content on the computing device display. The method further comprising performing the detecting and the hiding only in response to a user input requesting that the computing device hide sensitive content. The under-display sensor comprising a fingerprint sensor, and the detecting comprising detecting that the person is an authorized user of the computing device in response to authenticating a fingerprint of the person. The displaying the selectable item comprising displaying the selectable item on a lock screen of the computing device. The method further comprising: determining, in response to the person being an authorized user of the computing device, whether one or more additional people are looking at the computing device display; and in response to one or more additional people looking at the computing device display, hiding sensitive content at the computing device rather than displaying the sensitive content at the computing device. The sensitive content comprising text notifications. The detecting comprising receiving first authentication information from the user and detecting whether the person is an authorized user of the computing device using a first authentication mechanism and the first authentication information, the method further comprising: receiving second authentication information from the user; detecting, using a second authentication mechanism and the second authentication information, that the person is an authorized user of the computing device; unlocking the computing device in response to detecting, using the second authentication mechanism and the second authentication information, that the person is an authorized user of the computing device; and displaying the sensitive content on the computing device display while the computing device is unlocked. The detecting comprising receiving, while the computing device is operating in a low power mode, first authentication information from the user and detecting, while the computing device is operating in the low power mode, whether the person is an authorized user of the computing device using a first authentication mechanism and the first authentication information, the method further comprising: receiving, while the computing device is operating in the low power mode, second authentication information from the user; detecting, while the computing device is operating in the low power mode and using a second authentication mechanism and the second authentication information, that the person is an authorized user of the computing device; switching the computing device to a higher power mode in response to detecting, using the second authentication mechanism and the second authentication information, that the person is an authorized user of the computing device; and displaying the sensitive content on the computing device display while the computing device is operating in the higher power mode.

A computing device comprising: a computing device display; an under-display sensor; a processor; and a computer-readable storage medium having stored thereon multiple instructions that, responsive to execution by the processor, cause the processor to perform acts including: displaying, on the computing device display, a selectable item corresponding to sensitive content; receiving a user input that is a selection by a person of the selectable item; detecting, in response to the user input, authentication information for the user; determining, using the authentication information, whether the person is an authorized user of the computing device; and in response to the person not being an authorized user of the computing device, hiding the sensitive content at the computing device.

Alternatively or in addition to the above described computing device, any one or combination of the following. The displaying comprising displaying the selectable item in a location situated above the under-display sensor. The under-display sensor comprising a fingerprint sensor, and the detecting comprising detecting that the person is an authorized user of the computing device in response to authenticating a fingerprint of the person.

A sensitive content display control system comprising: a sensitive content settings module, implemented at least in part in hardware, configured to receive a user indication whether the sensitive content display control system is to hide sensitive content; a user recognition module, implemented at least in part in hardware, configured to detect using an under-display sensor, while a computing device implementing the sensitive content display control system is operating in the low power mode and in response to the user indication to hide sensitive content, whether the person is an authorized user of the computing device; and a content display control module, implemented at least in part in hardware, configured to hide, while the computing device is operating in the low power mode and in response to both the user indication to hide sensitive content and the person not being an authorized user of the computing device, sensitive content at the computing device.

Alternatively or in addition to the above described system, any one or combination of the following. The selectable item comprising an icon. The under-display sensor comprising a fingerprint sensor, and wherein the user recognition module is configured to detect that the person is an authorized user of the computing device in response to authenticating a fingerprint of the person. The system further comprising: an additional people presence detection module configured to determine, in response to the person being an authorized user of the computing device, whether one or more additional people are looking at the computing device display; and wherein the content display control module is configured to, in response to both the person being an authorized user of the computing device and one or more additional people looking at the computing device display, hide sensitive content at the computing device. Wherein the content display control module is further configured to display, while the computing device is operating in the low power mode and in response to the person being an authorized user of the computing device, sensitive content at the computing device.

What is claimed is:

1. A sensitive content display control system comprising:
sensitive content settings logic, implemented at least in part in hardware, configured to receive a user indication whether the sensitive content display control system is to hide sensitive content;
user recognition logic, implemented at least in part in hardware, configured, while a computing device implementing the sensitive content display control system is implementing a power conserving technique to activate pixels located in only a portion of a display of the computing device, to:
  receive user input selecting a selectable icon associated with an application that is selectable to initiate display of sensitive content associated with the application;
  capture, using an under-display fingerprint sensor of the computing device, fingerprint data while the user input is being received; and
  detect, using the captured fingerprint data and in response to the user indication to hide sensitive content, whether a person present at the computing device is an authorized user of the computing device; and
content display control logic, implemented at least in part in hardware, configured to hide, while the computing device is implementing the power conserving technique and in response to both the user indication to hide sensitive content and the person not being an authorized user of the computing device, sensitive content at the computing device.

2. The system of claim 1, further comprising:
additional people presence detection logic, implemented at least in part in hardware, configured to determine, in response to the person being an authorized user of the computing device, whether one or more additional people are looking at the display of the computing device; and
wherein the content display control logic is configured to, in response to both the person being an authorized user of the computing device and one or more additional people looking at the display of the computing device, hide sensitive content at the computing device.

3. The system of claim 1, wherein the content display control logic is further configured to display, while the computing device is implementing the power conserving technique and in response to the person being an authorized user of the computing device, sensitive content at the computing device.

4. The system of claim 3, wherein the computing device is configured to continue to implement the power conserving technique while the user recognition logic receives the user input selecting the selectable icon, captures the fingerprint data, and detects whether the person is an authorized user of the computing device, and while the content display logic hides the sensitive content at the computing device and displays the sensitive content at the computing device.

5. The system of claim 1, wherein the selectable icon is displayed in a location of the display situated above the under-display fingerprint sensor.

6. The system of claim 1, wherein the user recognition logic is configured to detect whether the person is an authorized user of the computing device by comparing the captured fingerprint data to stored fingerprint data for the user.

7. A method comprising:
receiving, by a computing device, a user indication whether to hide sensitive content; and
while the computing device is implementing a power conserving technique to activate pixels located in only a portion of a display of the computing device:
  receiving, by the computing device, user input selecting a selectable icon associated with an application that is selectable to initiate display of sensitive content associated with the application;
  capturing, using an under-display fingerprint sensor of the computing device, fingerprint data while the user input is being received;
  detecting, using the captured fingerprint data and in response to the user indication to hide sensitive content, whether a person present at the computing device is an authorized user of the computing device; and
  hiding, in response to both the user indication to hide sensitive content and the person not being an authorized user of the computing device, sensitive content at the computing device.

8. The method of claim 7, further comprising:
determining, in response to the person being an authorized user of the computing device, whether one or more additional people are looking at the display of the computing device; and
hiding, in response to both the person being an authorized user of the computing device and one or more additional people looking at the display of the computing device, sensitive content at the computing device.

9. The method of claim 7, further comprising displaying, while the computing device is implementing the power conserving technique and in response to the person being an authorized user of the computing device, sensitive content at the computing device.

10. The method of claim 9, wherein the receiving the user input selecting the selectable icon, the capturing the fingerprint data, the detecting whether the person is an authorized user of the computing device, the hiding the sensitive content at the computing device, and the displaying the sensitive content at the computing device are performed while the computing device is implementing the power conserving technique.

11. The method of claim 9, and wherein the receiving the user input selecting the selectable icon, the capturing the fingerprint data, the detecting whether the person is an authorized user of the computing device, the hiding the sensitive content at the computing device, and the displaying the sensitive content at the computing device are performed while a lock screen is displayed on the computing device.

12. The method of claim 7, wherein the under-display fingerprint sensor is situated under a portion of the display, and the selectable icon is displayed at the portion of the display.

13. The method of claim 7, wherein the detecting whether the person is an authorized user of the computing device is performed by comparing the captured fingerprint data to stored fingerprint data for the user.

14. A computing device comprising:
a display;
an under-display fingerprint sensor;
a processor; and
a computer-readable storage medium having stored thereon multiple instructions that, responsive to execution by the processor, cause the processor to perform acts including:
receiving a user indication whether to hide sensitive content; and
while implementing a power conserving technique to activate pixels located in only a portion of the display:
receiving user input selecting a selectable icon associated with an application that is selectable to initiate display of sensitive content associated with the application;
capturing, using the under-display fingerprint sensor, fingerprint data while the user input is being received;
detecting, using the captured fingerprint data and in response to the user indication to hide sensitive content, whether a person present at the computing device is an authorized user of the computing device; and
hiding, in response to both the user indication to hide sensitive content and the person not being an authorized user of the computing device, sensitive content at the computing device.

15. The computing device of claim 14, the acts further including:
determining, in response to the person being an authorized user of the computing device, whether one or more additional people are looking at the display of the computing device; and
hiding, in response to both the person being an authorized user of the computing device and one or more additional people looking at the display of the computing device, sensitive content at the computing device.

16. The computing device of claim 14, the acts further including displaying, while the computing device is implementing the power conserving technique and in response to the person being an authorized user of the computing device, sensitive content at the computing device.

17. The computing device of claim 16, wherein the receiving the user input selecting the selectable icon, the capturing the fingerprint data, the detecting whether the person is an authorized user of the computing device, the hiding the sensitive content at the computing device, and the displaying the sensitive content at the computing device are performed while a lock screen is displayed on the display.

18. The computing device of claim 14, wherein the receiving the user input selecting the selectable icon, the capturing the fingerprint data, the detecting whether the person is an authorized user of the computing device, the hiding the sensitive content at the computing device, and the displaying the sensitive content at the computing device are performed while the computing device is implementing the power conserving technique.

19. The computing device of claim 14, wherein the under-display fingerprint sensor is situated under a portion of the display, and the selectable icon is displayed at the portion of the display.

20. The computing device of claim 14, wherein the detecting whether the person is an authorized user of the computing device is performed by comparing the captured fingerprint data to stored fingerprint data for the user.

* * * * *